United States Patent [19]
Potter et al.

[11] Patent Number: 6,150,776
[45] Date of Patent: Nov. 21, 2000

[54] VARIABLE FREQUENCY MOTOR STARTING SYSTEM AND METHOD

[75] Inventors: Richard W. Potter, Winfield; Anton Belehradek, Downers Grove, both of Ill.

[73] Assignee: Metropolitan Industries, Inc., Romeoville, Ill.

[21] Appl. No.: 09/304,757

[22] Filed: May 4, 1999

[51] Int. Cl.$^7$ ...................................................... H02P 5/00
[52] U.S. Cl. .......................... 318/139; 318/732; 318/705; 318/719; 318/722; 318/827
[58] Field of Search .................................. 318/139, 732, 318/705, 719, 722, 827

[56] References Cited

U.S. PATENT DOCUMENTS

| 4,471,196 | 9/1984 | Frank et al. ............................ 318/139 |
| 4,812,730 | 3/1989 | Nakagawa et al. . |
| 5,162,718 | 11/1992 | Schroeder . |
| 5,777,459 | 7/1998 | Bansal et al. . |

*Primary Examiner*—Karen Masih
*Attorney, Agent, or Firm*—Rockey, Milnamow & Katz, Ltd.

[57] ABSTRACT

A variable frequency motor starting system has a variable frequency AC power supply for generating an AC power output signal applied to an AC motor. A controller is coupled to the variable frequency AC power supply for producing a control signal for adjusting the frequency of the AC power output signal produced. Upon initially applying power to an AC motor or detection of a starting current for an AC motor, the controller adjusts the frequency of the power output signal applied to the AC motor. The frequency of the power output signal is adjusted to a value below the value of the typical operating frequency. The value of the frequency can be increased to the final operating value.

37 Claims, 4 Drawing Sheets

VARIABLE FREQUENCY MOTOR STARTING SYSTEM AND METHOD

FIELD OF THE INVENTION

The invention pertains to a system and method for starting an AC motor. More specifically, the invention pertains to adjusting the frequency of the power signal applied to the AC motor.

BACKGROUND OF THE INVENTION

When power is initially applied to an electric motor, and the motor begins to accelerate from rest, the electric motor must overcome several boundaries, one of which includes an initial inertia. Furthermore during the starting cycle or the time during which the motor accelerates up to its operating speed, also known as run up, the torque developed by the motor at any given instant needs to exceed the torque required by the load at that speed. If the torque developed by the motor fails to exceed the torque required by the load, the load will begin to decelerate and the motor may eventually stall.

At any given speed during run up, the difference between the motor torque and the load torque is known as the accelerating torque. A positive accelerating torque will result in the speed of the motor increasing to its operating speed. Taken over the complete curve of torque versus speed as the speed of the motor increases from rest to its operating speed, the accelerating torque in combination with the load moment of inertia determines the run up time.

During this time a large amount of current is required by the motor to overcome the torque imposed by the load. For power systems having limitations in the amount of power they are capable of supplying, for example a stand-by uninterruptable power supply, the large current requirement during run up may present a couple of problems. First, if the current is large enough it may trip an over current monitor, which may result in the system temporarily disabling itself for a predetermined period of time. Second, even if the current does not trip the over current monitor, the system may inherently compensate for the increased current by reducing the output voltage. This is because power is a function of voltage and current, wherein P=V ×I. For systems at their power limit, in order for current to increase, voltage must correspondingly decrease. The corresponding decrease in voltage can cause some motors to stall or slip thereby preventing proper operation.

Thus, there continues to be a need for starter circuits which can supply appropriate starting currents to respective motors during run up. Preferably such functionality can be provided without unduly increasing circuit complexity or cost.

SUMMARY OF THE INVENTION

A variable frequency motor starting system incorporates a variable frequency AC power supply for generating an AC power output signal. A controller, coupled to the variable frequency AC power supply, produces a control signal for adjusting the frequency of the AC power output signal generated by the supply.

The controller adjusts the frequency from a first value to a second value, wherein the second value is below the typical operating frequency. The controller then adjusts the frequency by increasing it from the second value to a final value.

In one aspect of the invention, a detector detects the application of AC power to the AC motor. The controller adjusts the frequency of the AC power output signal in response thereto.

In another aspect of the invention, after adjusting the value of the frequency of the AC power output signal to a final value, the controller will maintain the value of the frequency at the final value, unless the motor is subsequently stopped and needs to be restarted. In yet another aspect of the invention, the system receives power from a DC power source, which may include one or more batteries.

A method of starting an AC motor incorporates the steps of applying a varying voltage to an AC motor, wherein the nominal frequency of the applied voltage is adjusted. The frequency of the varying voltage is initially adjusted from a first value to a second value, which is below the typical operating frequency of the applied voltage. Then the frequency of the varying voltage is selectively increased from the second value to its final value.

These and other aspects and attributes of the present invention will become increasingly clear from the following detailed description of the invention and the embodiments thereof, from the claims and from the accompanying drawings.

DETAILED DESCRIPTION OF THE PREFERRED EMBODIMENTS

Figure 1:
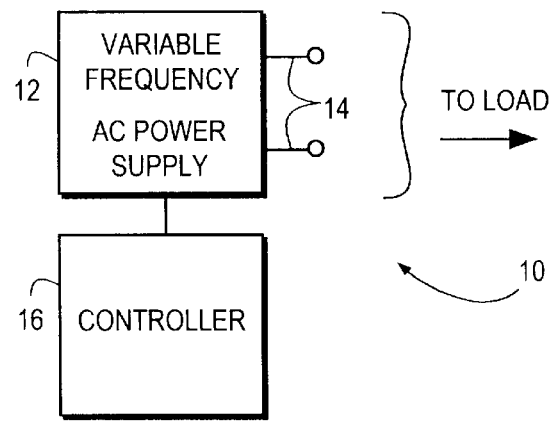
FIG. 1 is a block diagram of a variable frequency motor starting system in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

The operational speed of an induction motor is equivalent to the synchronous speed less the slip which increases with applied load torque and friction. "Synchronous speed" is the speed the motor would obtain if the rotor of the motor rotated in synchrony with the magnetic field. Frictional losses include friction in the bearings, air resistance within the motor, and additional drag imposed by the load. In an induction motor, the amount the rotor lags behind the rotational speed of the magnetic field is known as "slip".

For a synchronous motor, synchronous speed measured in revolutions per minute (RPM) is defined by the equation:

*Synchronous Speed (RPM)=(line frequency×120)/# of poles* line frequency=frequency in hertz of AC line supplying power to the motor # of poles=number of poles within the stator core of the motor For a synchronous motor, torque measured in Newton-Meters is defined by the equation:

$$Torque=(kW \times 9550)/RPM$$

kW=power rating for the motor (1 kW=1.34 hp)

From the above noted equation for torque, it can be seen that torque is inversely related to the speed of the motor (RPM), such that as RPM decreases, the torque will increase. Since RPM is directly related to the frequency of the AC line supplying power to the motor, as can be seen by the first equation, the torque of the motor can be varied by varying the frequency of the AC line. Specifically, combining the first two equations results in the following third equation:

$$Torque=(kW \times 9550 \times \text{\# of poles})/(120 \times line\ frequency)$$

Correspondingly, when power is initially applied to an AC motor or a large surge or starting current is detected indicative of an AC motor being initially started, the frequency of the AC line supplying power to the motor can be set at or ramped to a frequency below the typical AC line frequency. As the frequency is adjusted to a frequency below the typical AC line frequency, the surge current is decreased and the starting torque is increased.

Once the motor approaches the synchronous speed at the frequency below the typical AC line frequency, the frequency of the AC line is increased or ramped up, so as to bring the motor up to its ideal operating frequency. In many instances the ideal operating frequency is the typical operating frequency.

FIG. 1 illustrates a block diagram of a variable frequency starting system 10 which embodies the teachings of the present invention. The system 10 includes a variable frequency AC power supply 12, which includes power output terminal(s) 14 adapted for applying the AC power output signal to a load, like an AC motor. The system 10 further includes a controller 16 coupled to the variable frequency AC power supply 12. The controller 16 produces a control signal for adjusting the frequency of the AC power output signal generated by the variable frequency AC power supply 12.

Figure 2:
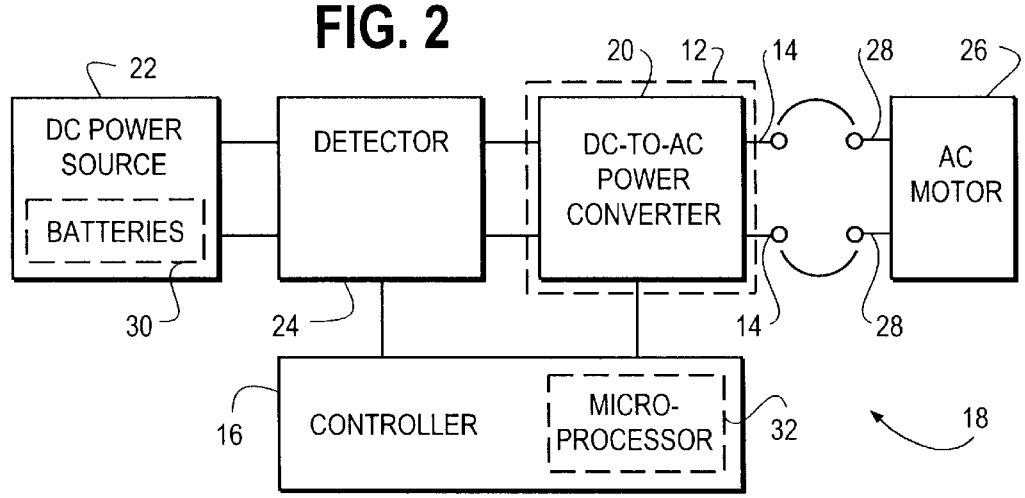
FIG. 2 is a more detailed block diagram of one aspect of the variable frequency motor starting system of FIG. 1.

FIG. 2 illustrates a more detailed block diagram of a variable frequency starting system 18, according to one aspect of the variable frequency motor starting system 10 of FIG. 1. The system 18 includes a variable frequency AC power supply 12, including a DC-to-AC power converter 20. The DC-to-AC power converter 20 is coupled to a DC power source 22 via a detector 24. The power supply generates an AC power output signal at power output terminal(s) 14. The output terminals are adapted for coupling the generated AC power output signal to a load, like an AC motor 26 via corresponding input terminals 28.

In some embodiments, for example for use in an uninterruptable power supply, the DC power source can be provided by one or more batteries 30, which may be rechargeable. Other variable frequency supplies are within the spirit and scope of the present invention.

The system 18 further includes a controller 16, coupled to the DC-to-AC power converter 20 for producing a control signal for adjusting the frequency of the AC power output signal. The controller 16 can be implemented using programmable or hardwired logic arrays, read only or random access memories, and/or microprocessors. In a preferred embodiment the controller 16 includes a microprocessor 32, illustrated in FIG. 2 with dashed lines. The controller of the preferred embodiment further includes a corresponding control program. Instructions for the program are stored in a memory, separate from or as part of the microprocessor 32.

In addition to being coupled to the DC-to-AC power converter 20, the controller 16 is coupled to the detector 24. The detector 24 detects the need to start an AC motor 26 coupled to the power output terminal(s) 14 and provides a corresponding indication to the controller 16. When the controller 16 receives the indication from the detector 24, the controller produces a control signal for adjusting the frequency of the power output signal generated by the DC-to-AC power converter 20. Detector 24 can also be located at the output side of output terminal(s) 14.

In one of the preferred embodiments, the detector monitors the signal characteristics of the power supplied to the DC-to-AC power converter 20 from the DC power source 22. The signal characteristics of the power supplied to the DC-to-AC power converter 20 are proportional to signal characteristics of the power supplied to the load coupled to the power output terminal(s) 14. As previously explained, when an AC motor 26 is accelerated from rest a large amount of current is required. Consequently a large surge current is produced. The detector 24 monitors the signal characteristics and when the large surge current is detected, the detector 24 provides an indication to the controller 16.

Because a corresponding surge current is present at both the input and the output of the DC-to-AC power converter 20, the detector 24 may be coupled so as to monitor the signal at either of the two points. In addition to monitoring for a surge current or related signal characteristic, a detector could monitor for an external stimulus, which alternatively identifies the start of an AC motor 26. For example, a signal identifying the presence of water may be detected, which triggers the start of a pump motor.

When power is initially supplied to a load, for starting the AC motor 26, the controller 16 adjusts the frequency of the AC power output signal from a first value to a second value, which is below the typical operating frequency. When the motor 26 reaches a speed at or near the synchronous speed for an applied voltage having a frequency with the second value, the controller 16 selectively increases the frequency of the power output signal generated by the variable frequency AC power supply 12 to a final value.

Figure 3:
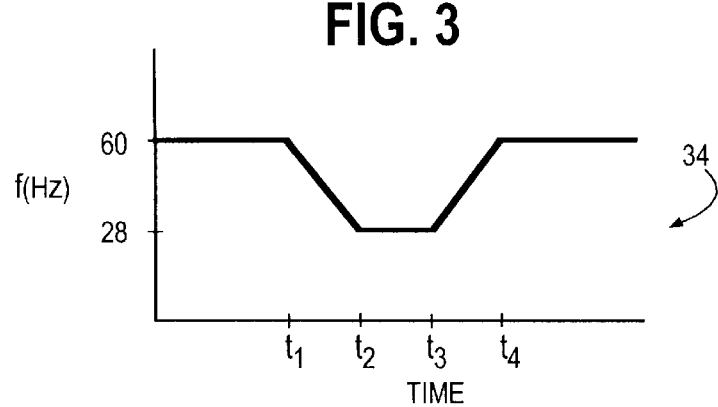
FIG. 3 is a graph depicting an example of frequency as a function of time of the AC power output signal generated by the variable frequency motor starting systems of FIGS. 1 or 2.

An example of frequency as a function of time of the AC power output signal generated by the variable frequency motor starting systems is illustrated by graph 34 in FIG. 3. Initially the AC power output signal has a frequency of 60 Hz, which corresponds to a typical line frequency of power supplied by the local utility in many jurisdictions and a typical operating frequency for the AC motor 26. It can be readily appreciated, that alternative starting frequencies could be used including a frequency of zero, which may indicate no power being initially supplied at the power output terminal(s) 14 of the variable frequency AC power supply 12.

When power is to be supplied for starting an AC motor 26, which may correspond to a surge current being detected, the frequency of the AC power output signal is adjusted from a first value to a second value, which is below the typical operating frequency. In graph 34, this transition is illustrated during time period from $t_1$ to $t_2$, when the first frequency of 60 Hz at time $t_1$ is adjusted to a second frequency of 28 Hz through time $t_2$.

By adjusting the frequency of the AC power output signal to a value below the typical operating frequency, the starting current of the AC motor decreases and the starting torque increases.

In the illustrated example, the frequency is maintained at 28 Hz, for a period of time from $t_2$ to $t_3$ before the frequency of the AC power output signal is selectively increased from the second value to a final value. In many instances this will enable the AC motor 26 to approach a synchronous speed corresponding to the second frequency. In other embodiments this time period may be longer or shorter, or may even be eliminated.

The frequency of the AC power output signal is then selectively increased from a second value to a final value. In graph 34, this transition is illustrated during time period from $t_3$ to $t_4$, when the frequency having a second value of 28 Hz is selectively increased to a final value of 60 Hz. In the illustrated example, the final value at $t_4$ of 60 Hz corresponds to the first value which also has a value of 60 Hz.

In a preferred embodiment, the transition of the frequency from a first value to a second value and from a second value to a final value will occur in a controlled ramp down or ramp up. In some embodiments, the transitions of the value of the frequency from $t_1$ to $t_2$ and from $t_3$ to $t_4$ will be relatively linear, i.e. have a constant slope, as illustrated in graph 34. Nonlinear transitions where the slope varies during the transition are similarly possible. Furthermore, each of the transition times can be longer or shorter.

Figure 4:
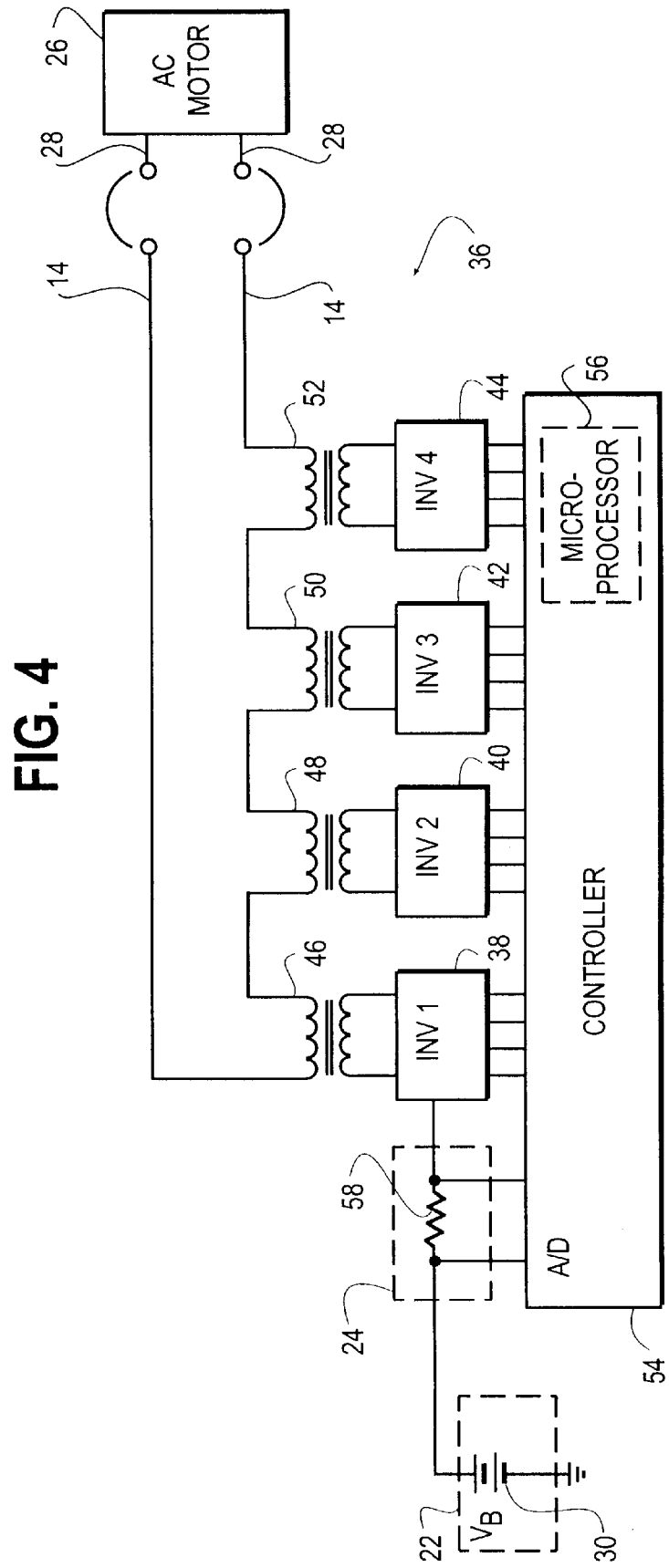
FIG. 4 is a further more detailed block diagram of one aspect of the variable frequency motor starting system of FIG. 1.

FIG. 4 illustrates a more detailed block diagram of a variable frequency starting system 36, according to one aspect of the variable frequency motor starting system 10 of FIG. 1. The variable frequency starting system 36 includes features of a variable output power supply, which closely corresponds to a low distortion variable output power supply disclosed in Reichard, U.S. Pat. No. 5,508,905, wherein a more specific discussion is provided, the disclosure of which is incorporated herein by reference.

Specifically, the starting system 36, provides a plurality of bridge type inverters 38,40,42 and 44, and a plurality of transformers 46, 48, 50 and 52. One coil of each of the plurality of transformers 46, 48, 50 and 52, is coupled to a corresponding one of the plurality of inverters 38, 40, 42 and 44. The other coil of each of the plurality of transformers 46, 48, 50 and 52 is coupled together in series. The inverters 38, 40, 42 and 44 are additionally coupled to a DC power source 22 including one or more batteries 30, via detector 24.

The system 36, further provides for a controller 54 coupled to the plurality of inverters 38, 40, 42 and 44, for selectively enabling each of the inverters. By selectively enabling each of the inverters 38, 40, 42 and 44, resulting in current selectively flowing through the corresponding coil of one or more of transformers 46, 48, 50 and 52, an AC power output signal can be produced at power output terminal(s) 14, from a power signal received from DC power source 22.

The same controller can be used to adjust the frequency of the AC power output signal generated, by varying the rate at which the inverters 38, 40, 42 and 44 are selectively enabled.

Similar to controller 16 shown in FIG. 2, controller 54 can be implemented using programmable or hardwired logic arrays, read only or random access memories, and/or microprocessors. In the preferred embodiment, controller 54 includes a microprocessor 56 and a corresponding control program. Instructions for the program are stored in a memory, separate from or as part of the microprocessor 56.

The controller is further coupled to detector 24 for detecting the application of the AC power output signal to AC motor 26 for starting the motor. Specifically, in the preferred embodiment the detector is a resistor 58 coupled in series between the DC power source 22 and the inverters 38, 40, 42 and 44. The current supplied by the DC power source 22 produces a corresponding voltage drop across resistor 58.

The voltage differential is monitored by the controller 54 to determine when a large surge current is present. In response to the detected surge current, indicative of the start of an AC motor 26, the controller 54 will produce control signal(s) for varying the frequency of the AC power output signal to facilitate the starting of the AC motor 26.

In the preferred embodiment the pair of signals representing the voltage differential is received by the inputs of an A/D converter incorporated as part of the controller 54. The value of resister 58 is selected so as to be small enough to minimize the voltage drop across the resistor, but large enough to provide a sufficient voltage differential to be monitored by the controller 54.

As previously noted adjusting the frequency of the AC power output signal to a value below the typical operating frequency results in the decrease of the starting current and an increase of the starting torque of an AC motor. Managing overall current usage including reducing the starting current for the AC motor extends the ability of existing inverters used in variable output power supplies to start motors which at the normal operating frequency have a starting current requirement which exceeds the current rating of the inverters. Alternatively, smaller inverters (i.e. inverters rated for lower currents) can be used in place of existing larger or higher rated inverters. The same benefit extends to other components of the variable output power supplies used to generate and/or are exposed to the starting current of the AC motor.

While FIG. 4 illustrates one aspect of the variable frequency motor starting system of the present invention, wherein the variable frequency power supply includes multiple inverters, transformers and a controller, one will readily appreciate that other types of variable frequency power sources could be used. Examples without limitation include variable frequency power sources using other types of inverter designs with and without the use of transformers, variable frequency drive systems for use with motors, motor generator sets, and other types of variable frequency power sources.

Furthermore, the present invention could be used for starting other types of motors. For example the present invention could be used to start stepper motors by varying the frequency of the pulses used to turn the motor. Correspondingly, the envelope of the waveform of the signal applied to the motor could be continuous or discontinuous.

Figure 5:
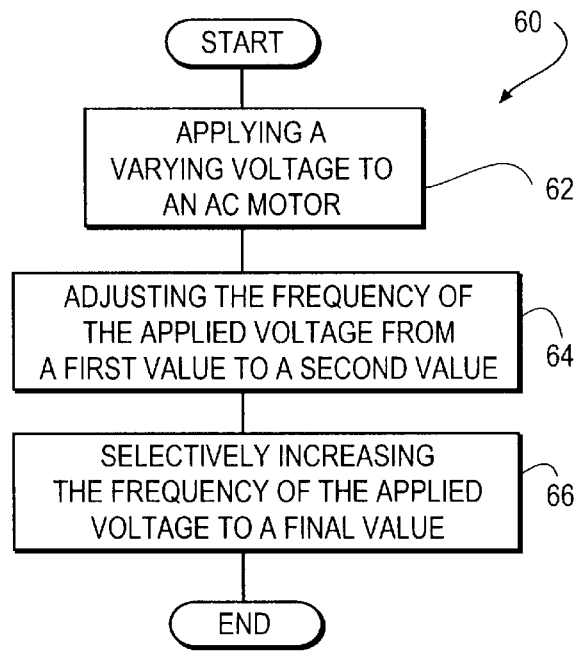
FIG. 5 is a flow diagram of a method of starting an AC motor for use with the systems of FIGS. 1, 2 or 4.

FIG. 5 illustrates a flow diagram of a method 60 of starting an AC motor for use with the systems of FIGS. 1, 2 or 4. The method 60 provides for applying, in step 62, a varying voltage to an AC motor. The nominal frequency of the varying voltage is then adjusted, in step 64, from a first value to a second value, which is below the typical operating frequency of the applied voltage. The frequency of the applied varying voltage is then selectively increased, in step 66, from the second value to a final value. In some aspects of the present invention the final value will correspond to the typical operating frequency. The typical operating frequency can also correspond to the line frequency of the power signal supplied by the local utility.

In some embodiments of the present invention, the adjustment or the selective increment of the nominal frequency includes ramping up and/or ramping down the value of the frequency in a controlled fashion. Additionally, adjustment of the value of the nominal frequency may be linear in nature.

In another embodiment, prior to the adjusting step 64, the method performs the step of detecting the need to start an AC motor, which can take the form of detecting a starting current. In yet another embodiment the method further includes, after the increasing step 66, maintaining the applied voltage at the final frequency unless the motor has been stopped and needs to be restarted.

Figure 6A:
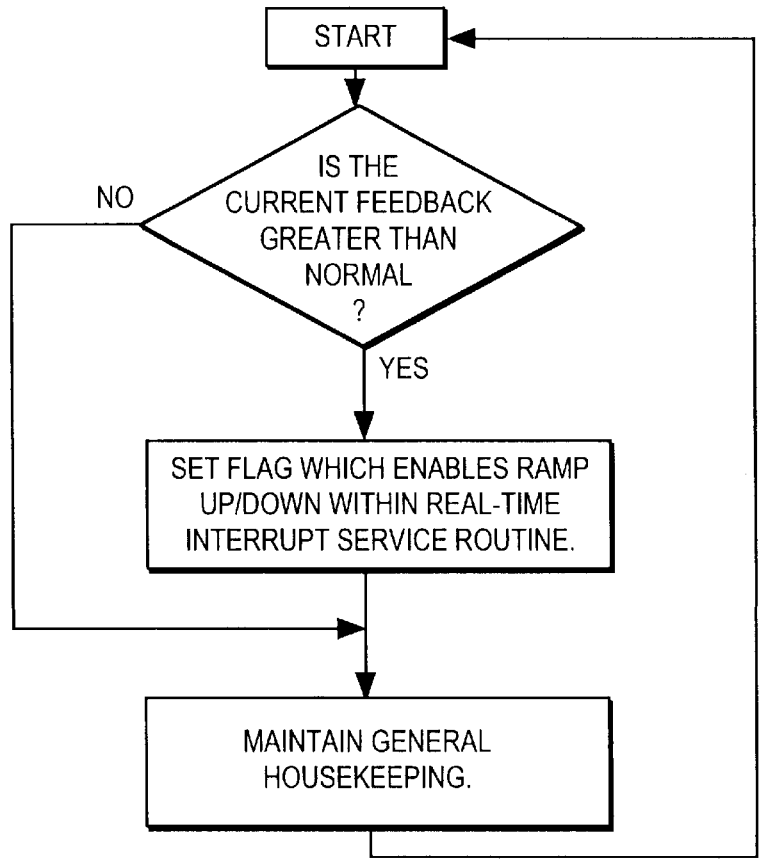
FIGS. 6A and 6B are more detailed flow diagrams, which together illustrate a method of starting an AC motor for use with the system of FIG. 4.
Figure 6B:
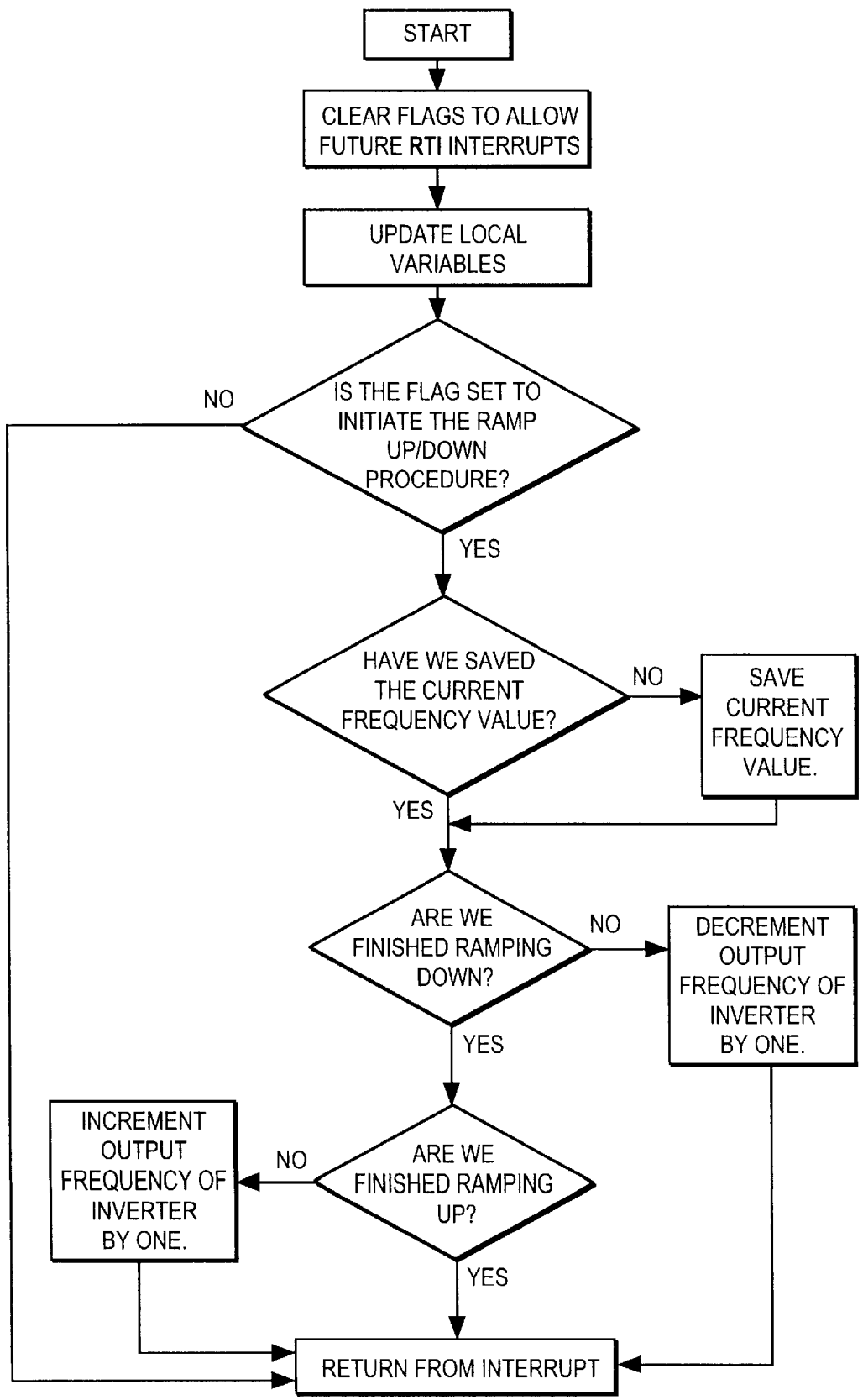

FIGS. 6A and 6B, which together illustrate a more detailed flow diagram of a method of starting an AC motor for use with the systems of FIGS. 1, 2 or 4. Specifically FIG. 6A illustrates a main programming loop which will operates in absence of an interrupt. In addition to maintaining general housekeeping, the main programming loop detects current feedback which is greater than normal, indicative of a motor starting current, and enables the steps within the interrupt routine for adjusting the frequency of the voltage applied to the motor.

FIG. 6B illustrates the real time interrupt routine, which in addition to performing other interrupt associated tasks includes steps for adjusting and incrementing the frequency of the voltage applied to the motor. While the detailed flow diagram makes reference to incrementing and decrementing the output frequency of the inverter, it will be appreciated that the detailed flow diagram of FIGS. 6A and 6B can be readily adapted to other types of variable frequency sources.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed:

1. A variable frequency motor starting system comprising:
   a variable frequency AC power supply for generating an AC power output signal having a variable frequency, including a power output terminal adapted for applying the AC power output signal to an AC motor; and
   a controller coupled to the variable frequency AC power supply for producing a control signal for adjusting the frequency of the variable frequency AC power supply, wherein the controller adjusts the frequency from a first value to a second value, the second value being below the first value and then adjusts the frequency by increasing the frequency from the second value to a final value.

2. A system as in claim 1, further comprising a detector for detecting the application of the AC power output signal to the AC motor for starting the AC motor, wherein the controller adjusts the value of the frequency of the variable frequency AC power supply, in response thereto.

3. A system as in claim 2, wherein the detector includes a current detector for detecting a starting current provided to the AC motor via the power output terminal.

4. A system as in claim 1, further comprising a DC power source coupled to the variable frequency AC power supply, and wherein the variable frequency AC power supply includes a DC to AC power converter.

5. A system as in claim 4, wherein the DC power source comprises at least one battery.

6. A system as in claim 5, wherein at least one battery is rechargeable.

7. A system as in claim 1, wherein the variable frequency AC power supply includes a plurality of bridge-type inverters.

8. A system as in claim 1, wherein the final value comprises the first value.

9. A system as in claim 1, which includes a detector of a selected condition indicative of starting the AC motor.

10. A system as in claim 9, wherein the selected condition comprises the presence of a selected electrical parameter indicative of starting the motor.

11. A system as in claim 1, wherein the adjustment of the frequency from the first value to the second value includes a controlled ramp down of the frequency.

12. A system as in claim 1, wherein the adjustment of the frequency from the second value to the final value includes a controlled ramp up of the frequency.

13. A system as in claim 1, wherein the envelope of the AC power output signal applied to the motor is continuous.

14. A system as in claim 1 wherein the controller comprises a programmed processor and pre-stored executable instructions.

15. A system as in claim 1 wherein the detector is coupled to at least one of an energy input port for the supply and the output terminal.

16. A system as in claim 1 which includes a condition detector coupled to the controller wherein the detector responds to a predetermined external stimulus.

17. A system as in claim 16 wherein the external stimulus takes the form of a predetermined signal.

18. A system as in claim 16 wherein the predetermined signal comprises an indicator of the presence of a selected fluid.

19. A method of starting an AC motor comprising:
    applying a varying voltage to an AC motor;
    adjusting a nominal frequency of the applied varying voltage from a first value to a second value, wherein the second value is below the typical operating frequency of the applied voltage; and
    selectively increasing the value of the frequency of the applied varying voltage from the second value to a final value.

20. A method as in claim 14 further comprising, prior to the step of adjusting a nominal frequency of the applied varying voltage, the step of detecting a need to start the AC motor.

21. A method as in claim 20, wherein said step of detecting the need to start the AC motor includes detecting a starting current.

22. A method as in claim 19 further comprising, after the step of selectively increasing the value of the frequency of the applied varying voltage from the second value to a final value, maintaining the value of the frequency of the applied varying voltage at the final value until the AC motor is subsequently stopped and needs to be restarted.

23. A method as in claim 19, wherein the final value comprises the first value.

24. A method as in claim 19, wherein the step of adjusting a nominal frequency of the applied varying voltage includes adjusting the frequency from the first value to the second value in a controlled ramp down of the frequency.

25. A method as in claim 19, wherein the step of adjusting a nominal frequency of the applied varying voltage from a first value to a second value includes linearly adjusting the nominal frequency of the applied varying voltage from the first value to the second value.

26. A method as in claim 19, wherein the step of selectively increasing the frequency of an applied varying voltage includes increasing the frequency from the second value to the final value in a controlled ramp up of the frequency.

27. A method as in claim 19, wherein the step of selectively increasing the frequency of an applied varying voltage includes linearly increasing the frequency from the second value to the final value.

28. A variable frequency motor starting system comprising:

a variable frequency power supply for generating a variable power output signal having a variable frequency, including a power output terminal adapted for applying the power output signal to a motor; and a controller coupled to the variable frequency power supply for producing a control signal for adjusting the frequency of the variable frequency power supply, wherein the controller adjusts the frequency from a first value to a second value, in response to the control signal, the second value being less than the first value, and then adjusts the frequency by increasing the frequency from the second value to a final value.

29. A system as in claim 28, further comprising a detector for detecting the application of the power output signal to a stepping motor for starting that motor, wherein the controller adjusts the value of the frequency of the variable frequency power supply, in response thereto.

30. A system as in claim 28, which includes an element for detecting a starting electrical characteristic of the motor via the power output terminal.

31. A system as in claim 28, further comprising a DC power source coupled to the variable frequency power supply.

32. A system as in claim 31, wherein the DC power source comprises at least one battery.

33. A method of starting a motor comprising:

applying a varying voltage to a selected motor;

adjusting a nominal frequency of the applied varying voltage from a first value to a second value, wherein the second value is less than the first value; and selectively increasing the value of the frequency of the applied varying voltage from the second value to a final value in response to motor performance.

34. A method as in claim 33 further comprising, prior to the step of adjusting a nominal frequency of the applied varying voltage, the step of detecting a need to start the motor.

35. A method as in claim 34, wherein the step of detecting the need to start the AC motor includes detecting a starting current.

36. A method as in claim 33, wherein the final value comprises the first value.

37. A method as in claim 33, wherein the step of adjusting a nominal frequency of the applied varying voltage includes adjusting the frequency from the first value to the second value in a controlled ramp down of the frequency.

* * * * *